US012684355B2

(12) United States Patent　　　　(10) Patent No.:　US 12,684,355 B2
Gibson et al.　　　　　　　　　　　　(45) Date of Patent:　　Jul. 14, 2026

(54) ISOLATED TELCO FUNCTIONS FOR ENHANCED SECURITY MONITORING AND ANALYSIS

(71) Applicant: T-Mobile USA, Inc., Bellevue, WA (US)

(72) Inventors: Geoffrey Todd Gibson, Ben Wheeler, TX (US); Jeffrey Scott Simon, Issaquah, WA (US); Gaurav Madan, Snoqualmie, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 37 days.

(21) Appl. No.: 18/813,004

(22) Filed: Aug. 22, 2024

(65) Prior Publication Data

US 2026/0059319 A1　　Feb. 26, 2026

(51) Int. Cl.
H04W 12/128　　　(2021.01)
H04W 88/06　　　 (2009.01)

(52) U.S. Cl.
CPC .......... H04W 12/128 (2021.01); H04W 88/06 (2013.01)

(58) Field of Classification Search
CPC ........................... H04W 12/128; H04W 88/06
See application file for complete search history.

(56) References Cited

U.S. PATENT DOCUMENTS

| 2020/0050760 A1* | 2/2020 | El-Moussa ........... G06N 3/0499 |
| 2022/0330027 A1* | 10/2022 | Djukic ................ H04L 47/2475 |
| 2023/0199505 A1* | 6/2023 | Salkintzis ............. H04W 60/00 |
| | | 726/2 |
| 2025/0287210 A1* | 9/2025 | Pathania ............. H04W 12/128 |

FOREIGN PATENT DOCUMENTS

WO　　WO-2025074381 A1 *　4/2025　......... H04L 63/1408

* cited by examiner

*Primary Examiner* — Linglan Edwards
*Assistant Examiner* — Jacob Benedict Knackstedt
(74) *Attorney, Agent, or Firm* — Foley IP Law, PLLC

(57)　　　　　　　ABSTRACT

Solutions are disclosed that provide isolated telecommunication (telco) functions for enhanced security monitoring and analysis. Examples monitor a plurality of network functions (NFs) of a wireless network for indications of malicious activity, such as mobility management entities (MMEs), user plane functions (UPFs), authentication server functions (AUSFs), and others. When suspected malicious activity is detected from a user equipment (UE), an isolated telco stack (i.e., an isolated network slice) is stood up in real-time to isolate the traffic to/from the UE. This facilitates capturing and analyzing the traffic, so that a responsive action may be selected. The configuration of the isolated telco stack (i.e., the NFs included in the isolated network slice) may be customized based on the nature of the suspected malicious activity. For example, suspected data exfiltration will trigger a first configuration, whereas suspected denial service will trigger a different configuration.

17 Claims, 8 Drawing Sheets

CATEGORIZED ATTACKS 340

| 302 Malicious Activity Type | 304 Indications | 306 Network Functions To Isolate | 308 Responsive Action Options |
|---|---|---|---|
| Data Exfiltration 310 | 1. Observation A1 2. Observation A2 3. Observation A3 312 | Mobility Node Authentication Node Subscriber Node Packet Routing Node 220 | Remove From Network Block From Network Block User Account Alter Traffic Store Traffic 316 |
| Unauthorized Use 320 | 1. Observation B1 2. Observation B2 3. Observation B3 322 | Mobility Node Session Management Node Packet Routing Node 240 | Remove From Network Block From Network Block User Account 326 |
| Denial Of Service 330 | 1. Observation C1 2. Observation C2 332 | Mobility Node 334 | Remove From Network Block From Network Block User Account Alter Traffic 336 |

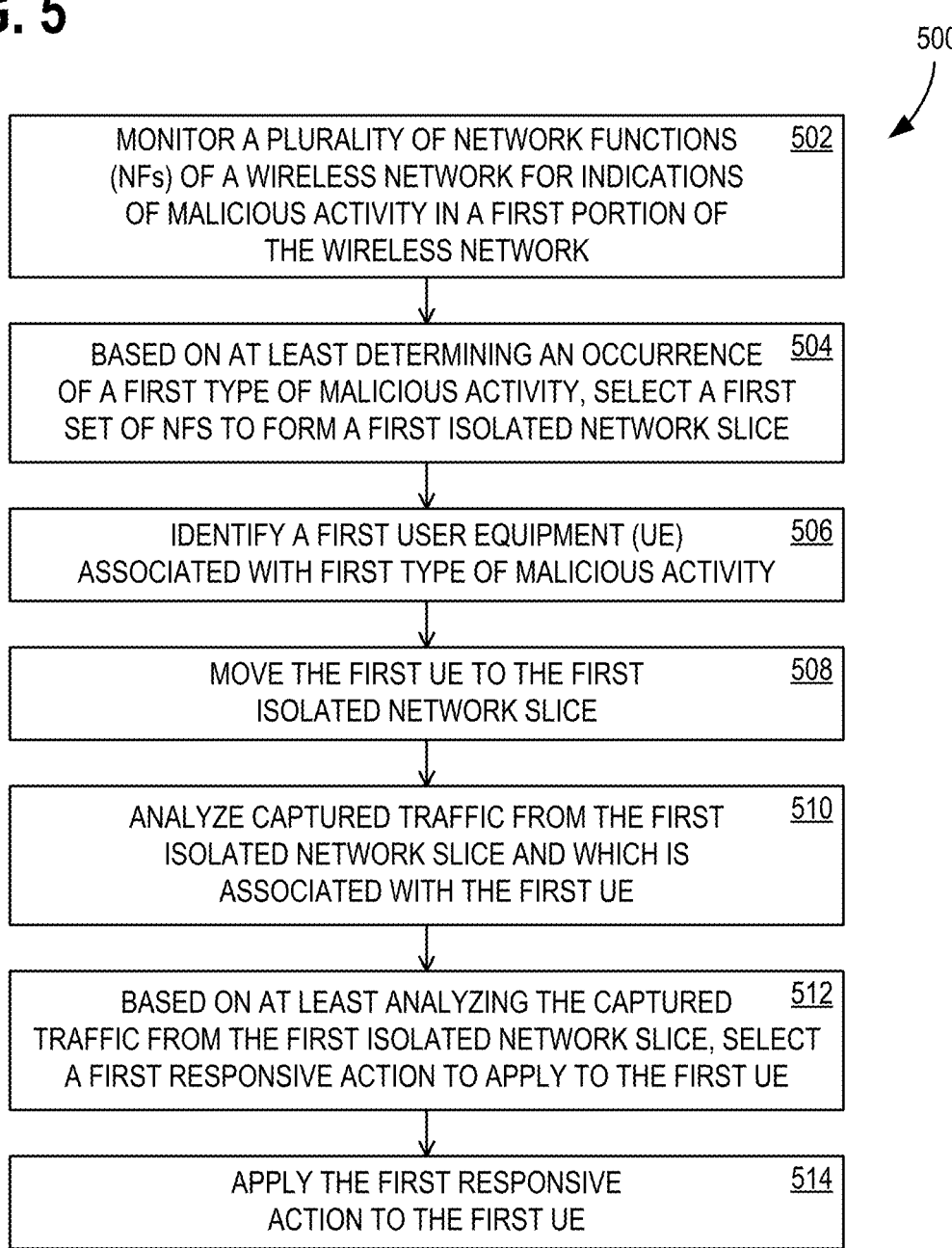

500

| |
|---|
| MONITOR A PLURALITY OF NETWORK FUNCTIONS    502<br>(NFs) OF A WIRELESS NETWORK FOR INDICATIONS<br>OF MALICIOUS ACTIVITY IN A FIRST PORTION OF<br>THE WIRELESS NETWORK |
| BASED ON AT LEAST DETERMINING AN OCCURRENCE    504<br>OF A FIRST TYPE OF MALICIOUS ACTIVITY, SELECT A FIRST<br>SET OF NFS TO FORM A FIRST ISOLATED NETWORK SLICE |
| IDENTIFY A FIRST USER EQUIPMENT (UE)    506<br>ASSOCIATED WITH FIRST TYPE OF MALICIOUS ACTIVITY |
| MOVE THE FIRST UE TO THE FIRST    508<br>ISOLATED NETWORK SLICE |
| ANALYZE CAPTURED TRAFFIC FROM THE FIRST    510<br>ISOLATED NETWORK SLICE AND WHICH IS<br>ASSOCIATED WITH THE FIRST UE |
| BASED ON AT LEAST ANALYZING THE CAPTURED    512<br>TRAFFIC FROM THE FIRST ISOLATED NETWORK SLICE, SELECT<br>A FIRST RESPONSIVE ACTION TO APPLY TO THE FIRST UE |
| APPLY THE FIRST RESPONSIVE    514<br>ACTION TO THE FIRST UE |

ISOLATED TELCO FUNCTIONS FOR ENHANCED SECURITY MONITORING AND ANALYSIS

BACKGROUND

Threat actors may view mobile network operators (MNOs, such as operators of wireless/cellular networks) as lucrative targets, due to the proliferation of smartphones, connected devices, and internet of things (IoT) devices and their reliance in banking, social media, smart homes, connected cars, and other infrastructure. Threat actors may use MNO services and target both wireless subscribers and MNO infrastructure (e.g., telecommunication (telco) network functions (NFs)).

MNOs store sensitive information for each subscriber, such as personal identifiable information (PII), credit card numbers, phone numbers, and cellphone equipment identifiers (IDs). Such information may be exploited in numerous ways by a threat actor to generate monetary gain and cause disruptions and damage. However, when a threat actor's device, such as a user equipment (UE) is detected generating potentially malicious traffic, or if the threat actor is outside of the MNO's cellular network and accessing the network via an exposed network function, the MNO has a limited set of options for defense and collecting forensic data from the threat actor's UE. For example, if the MNO has 100 million subscribers or more, the vast amount of data passing through the telco NFs (or telco functions) severely complicates extraction, correlation, analysis, and reaction in real-time.

SUMMARY

The following summary is provided to illustrate examples disclosed herein, but is not meant to limit all examples to any particular configuration or sequence of operations.

Solutions are disclosed that provide isolated telecommunication (telco) functions for enhanced security monitoring and analysis. Examples monitor a plurality of network functions (NFs) of a wireless network for indications of malicious activity in a first portion of the wireless network; based on at least determining an occurrence of a first type of malicious activity, select a first set of NFs to form a first isolated network slice; identify a first user equipment (UE) associated with first type of malicious activity; move the first UE to the first isolated network slice; analyze captured traffic from the first isolated network slice and which is associated with the first UE; based on at least analyzing the captured traffic from the first isolated network slice, select a first responsive action to apply to the first UE; and apply the first responsive action to the first UE.

BRIEF DESCRIPTION OF THE DRAWINGS

The disclosed examples are described below with reference to the accompanying drawing figures listed below, wherein:

FIGS. 2A, 2B, and 2C illustrate standing up isolated network slices that are tailored to various types of detected (suspect) malicious activity by a user equipment (UE), as may occur when using examples of the architecture of FIG. 1;

FIG. 3 illustrates monitoring and response data that may be used to categorize malicious activity into types of attacks, and to select a responsive action to apply a UE, when using examples of the architecture of FIG. 1;

FIGS. 4 and 5 illustrate flowcharts of exemplary operations associated with the architecture of FIG. 1.

Figure 1:
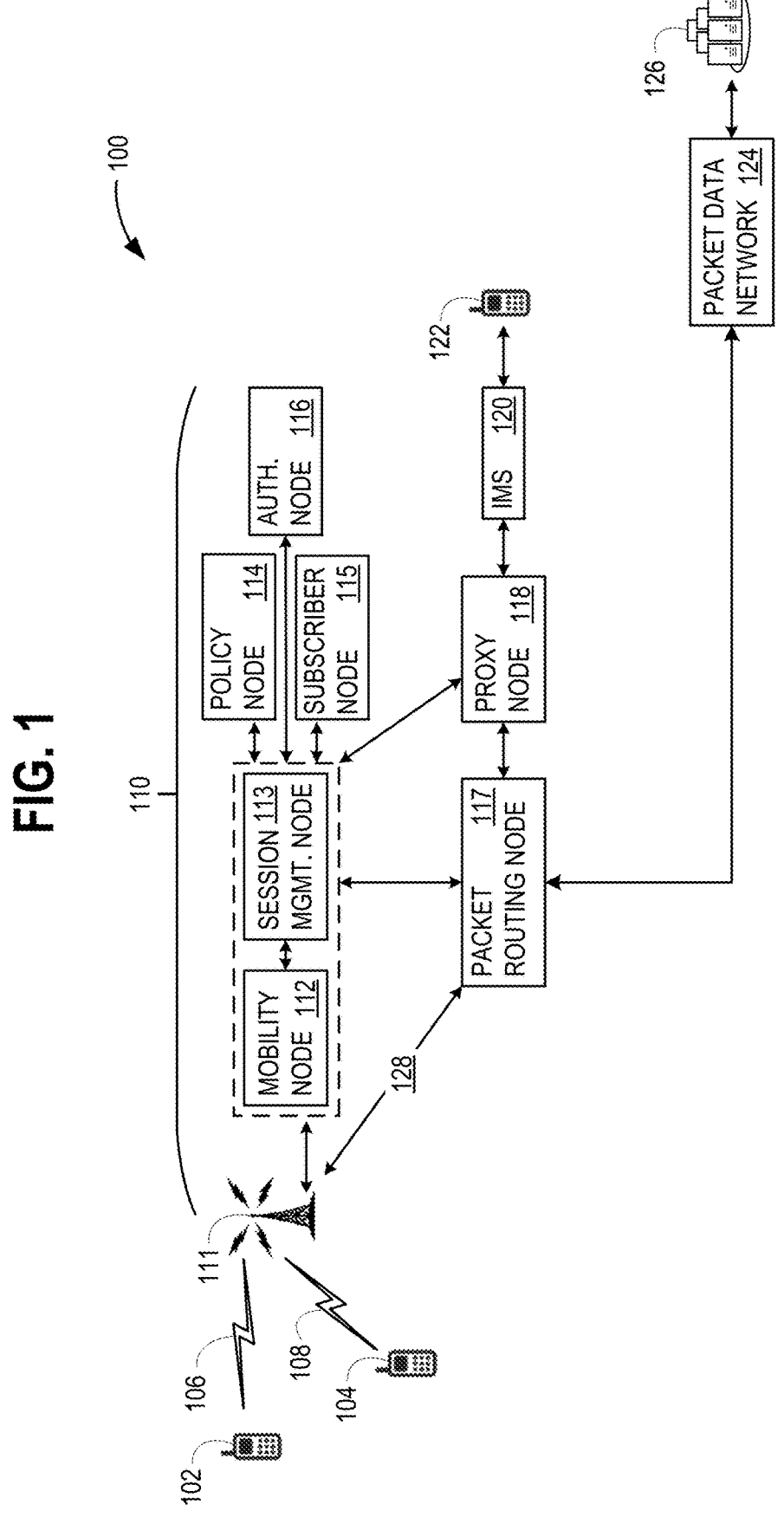
FIG. 1 illustrates an exemplary architecture that advantageously provides isolated telecommunication (telco) functions for enhanced security monitoring and analysis.

Corresponding reference characters indicate corresponding parts throughout the drawings. References made throughout this disclosure. relating to specific examples, are provided for illustrative purposes, and are not meant to limit all implementations or to be interpreted as excluding the existence of additional implementations that also incorporate the recited features.

DETAILED DESCRIPTION

Solutions are disclosed that provide isolated telecommunication (telco) functions for enhanced security monitoring and analysis. Examples monitor a plurality of network functions (NFs) of a wireless network for indications of malicious activity, such as mobility management entities (MMEs), user plane functions (UPFs), authentication server functions (AUSFs), and others. When suspected malicious activity is detected from a user equipment (UE), an isolated telco stack (i.e., an isolated network slice) is stood up in real-time to isolate the traffic to/from the UE. This facilitates capturing and analyzing the traffic, so that a responsive action may be selected. The configuration of the isolated telco stack (i.e., the NFs included in the isolated network slice) may be customized based on the nature of the suspected malicious activity. For example, suspected data exfiltration will trigger a first configuration, whereas suspected denial service will trigger a different configuration.

Aspects of the disclosure improve the security of wireless communication (e.g., cellular communication) by enabling a wireless network to isolate suspected malicious activity to a custom-built isolated network slice that is stood up in real-time. This enables capturing the relevant traffic more efficiently than is possible on the primary network portion, which may have millions of active UEs (thus complicating traffic capture), which in turn enables analyzing the traffic rapidly. Additionally, the isolated network slice facilitates altering traffic to or from the suspected UE, such as changing traffic going to the UE, and blocking or redirecting certain traffic from the UE into a sandbox or honeypot. These advantageous results are accomplished, at least in part, by determining an occurrence of a first type of malicious activity, selecting a first set of NFs to form a first isolated network slice; and moving the first UE to the first isolated network slice.

With reference now to the figures, FIG. 1 illustrates an exemplary architecture 100 that advantageously provides isolated telco functions for enhanced security monitoring and analysis. A wireless network 110 is illustrated that is serving a UE 102 and a UE 104. Each of UE 102 and UE 104 may be a cellphone telephone (e.g., smartphone), a fixed wireless access (FWA) device, internet of things (IoT) device, machine-to-machine (M2M) communication device, a personal computer (PC, e.g., desktop, notebook, tablet, etc.) with a cellular modem, or another telecommunication devices capable of using a wireless network. In the scene depicted in FIG. 1, UE 102 is using wireless network 110 for a packet data session to reach a network resource 126 (e.g., a website) across an external packet data network 124 (e.g., the internet). In some scenarios, UE 102 may use wireless network 110 for a phone call with another UE 122. Wireless network 110 may be a cellular network such as a fifth generation (5G) network, a fourth generation (4G) network, or another cellular generation network. In some contexts, 5G is also referred to as new radio (NR), and standalone 5G, which is a full 5G implementation that does not rely on 4G technology for some functionality, may be referred to SA NR.

UE 102 uses an air interface 106 to communicate with a base station 111 of wireless network 110, such that base station 111 is the serving base station for UE 102 (providing the serving cell), and UE 104 uses an air interface 108 to communicate with a base station 111. In some scenarios, base station 111 may be referred to as a radio access network (RAN). Wireless network 110 has a mobility node 112, a session management node 113, a policy node 114, a sub-scriber node 115, an authentication node 116, and other components (not shown). Wireless network 110 also has a packet routing node 117 and a proxy node 118. Mobility node 112, session management node 113, policy node 114, subscriber node 115, and authentication node 116 are within a control plane of wireless network 110, and packet routing node 117 is within a data plane (a.k.a. user plane) of wireless network 110.

Base station 111 is in communication with mobility node 112 and packet routing node 117. Mobility node 112 is in communication with session management node 113, which is in communication with policy node 114, a subscriber node 115, authentication node 116, packet routing node 117, and proxy node 118. Packet routing node 117 is in communica-tion with proxy node 118 and packet data network 124. In some 5G examples, base station 111 comprises a gNodeB (gNB), mobility node 112 comprises an access mobility function (AMF), session management node 113 comprises a session management function (SMF), policy node 114 com-prises a policy control function (PCF), subscriber node 115 comprises a unified data management (UDM), authentica-tion node 116 comprises an authentication server function (AUSF), and packet routing node 117 comprises a user plane function (UPF).

In some 4G examples, base station 111 comprises an eNodeB (eNB), mobility node 112 comprises a mobility management entity (MME), session management node 113 comprises a system architecture evolution gateway (SAEGW) control plane (SAEGW-C), policy node 114 comprises a policy and charging rules function (PCRF), subscriber node 115 comprises a home subscriber server (HSS) which may also provide some of the functionality described herein for authentication node 116, and packet routing node 117 comprises an SAEGW-user plane (SAEGW-U). In some examples, proxy node 118 comprises a proxy call session control function (P-CSCF) in both 4G and 5G.

In some examples, wireless network 110 has multiple ones of each of the components illustrated, in addition to other components and other connectivity among the illus-trated components. In some examples, wireless network 110 has components of multiple cellular technologies operating in parallel in order to provide service to UEs of different cellular generations. For example, wireless network 110 may use both a gNB and an eNB co-located at a common cell site. In some examples, multiple cells may be co-located at a common cell site, and may be a mix of 5G and 4G.

Proxy node 118 is in communication with an internet protocol (IP) multimedia system (IMS) 120, which uses an access gateway (IMS-AGW) in order to provide connectiv-ity to other wireless (cellular) networks, such as for a call with a UE 122 or a public switched telephone system (PSTN, also known as plain old telephone system, POTS).

In some examples, proxy node 118 may be considered to be within IMS 120. UE 102 reaches network resource 126 using packet data network 124 (or IMS 120, in some examples). Data packets of data traffic 128 to/from UE 102 pass through at least base station 111 and packet routing node 117 on their way from/to packet data network 124 or IMS 120 (via proxy node 118).

As illustrated in further detail in the remaining figures, and described more fully below in relation to the other figures, a security orchestrator 202 (shown in FIGS. 2A-2C) and monitoring and response data 300 (show in FIG. 3) enable wireless network 110 to advantageously provide isolated telco functions for enhanced security monitoring and analysis. Although FIG. 1 and some of the following figures are described using an example of a cellular network, it should be understood that the teachings herein are appli-cable to other types of wireless networks and even wired networks (e.g., fiber optic networks). To benefit from the teachings herein, another wireless network, other than a cellular network, should permit monitoring traffic for secu-rity issues, standing up a network slice, and moving iden-tified UEs to that network slice for traffic capture. With such features, another type of wireless network, other than a cellular network, may also benefit from the disclosure herein.

Figure 2A:
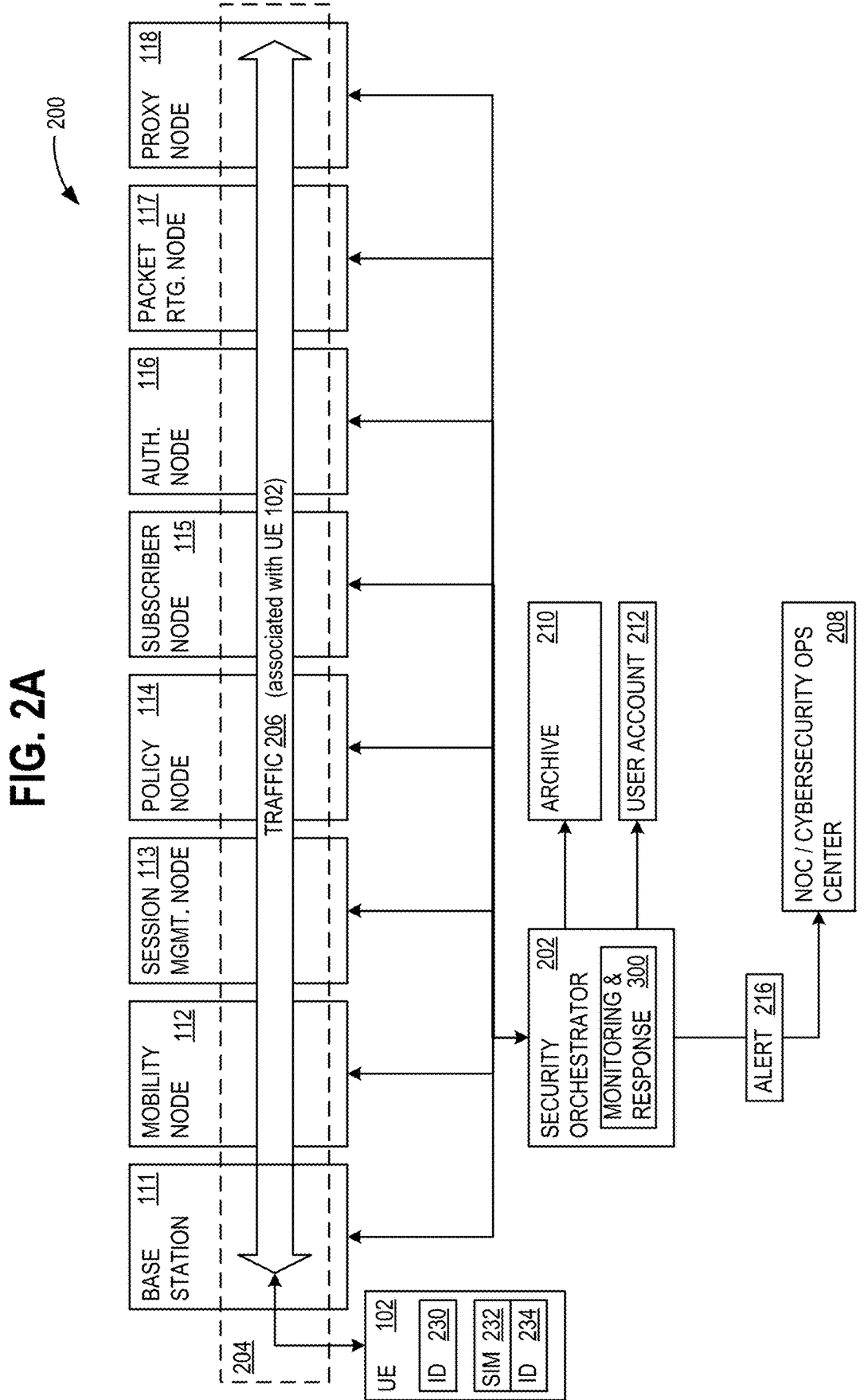

FIG. 2A illustrates an alternative view of components of architecture 100. A plurality of NFs 200 includes base station 111, mobility node 112, session management node 113, policy node 114, subscriber node 115, authentication node 116, packet routing node 117, and proxy node 118. Although only a single example of each type (class) of NF is illustrated, it should be understood that plurality of NFs 200 may include multiple ones of each type of NF (e.g., multiple mobility nodes 112). In some examples, one or more NFs of plurality of NFs 200 is implemented using virtualization, such as a virtual compute environment on underlying computational hardware, under the control of a hypervisor. A virtual compute environment may be a virtual machine (VM) or a container.

For most UEs which are not allocated to a particular network slice, or for those allocated to a network slice for reasons other than containment of malicious activity, the traffic to and from (and otherwise associated with) those UEs are on a portion 204 of wireless network 110 that may be considered to be their default or normal portion or traffic pathway through wireless network 110. For example, ini-tially, traffic 206 to/from (and otherwise associated with) UE 102 passes through portion 204 of wireless network 110 that includes the default (or normal) NFs: base station 111, mobility node 112, session management node 113, policy node 114, subscriber node 115, authentication node 116, packet routing node 117, and proxy node 118.

As illustrated, UE 102 has a UE identifier 230, which may be an international mobile equipment identity (IMEI). UE 102 also has a subscriber identity module (SIM) 232 that has an identifier 234 that may be an integrated circuit card identification (ICCID), an international mobile subscriber identity (IMSI) and/or a subscriber permanent identifier (SUPI). Wireless network 110 may user either UE identifier 230 or identifier 234 of SIM 232 to identify UE 102, and associate UE 102 with both traffic 206 and a user account 212.

Security orchestrator 202 uses monitoring and response data 300 to determine whether any traffic (e.g., traffic 206) passing through plurality of NFs 200 may be malicious and, if so, select which NFs of plurality of NFs 200 for which an isolated version should be stood up to create an isolated telco stack (i.e., an isolated network slice). Captured traffic may be stored in an archive 210 for later further forensic analysis, and to preserve as evidence for legal action against the attacker (i.e., the UE user) and to justify any responsive actions in the event that the attacker protests about any remedial responsive action. Security orchestrator 202 may also send an alert 216 to a network operations center (NOC) or cybersecurity operations center 208, describing the suspect attack detected and the responsive action selected.

Figure 2B:
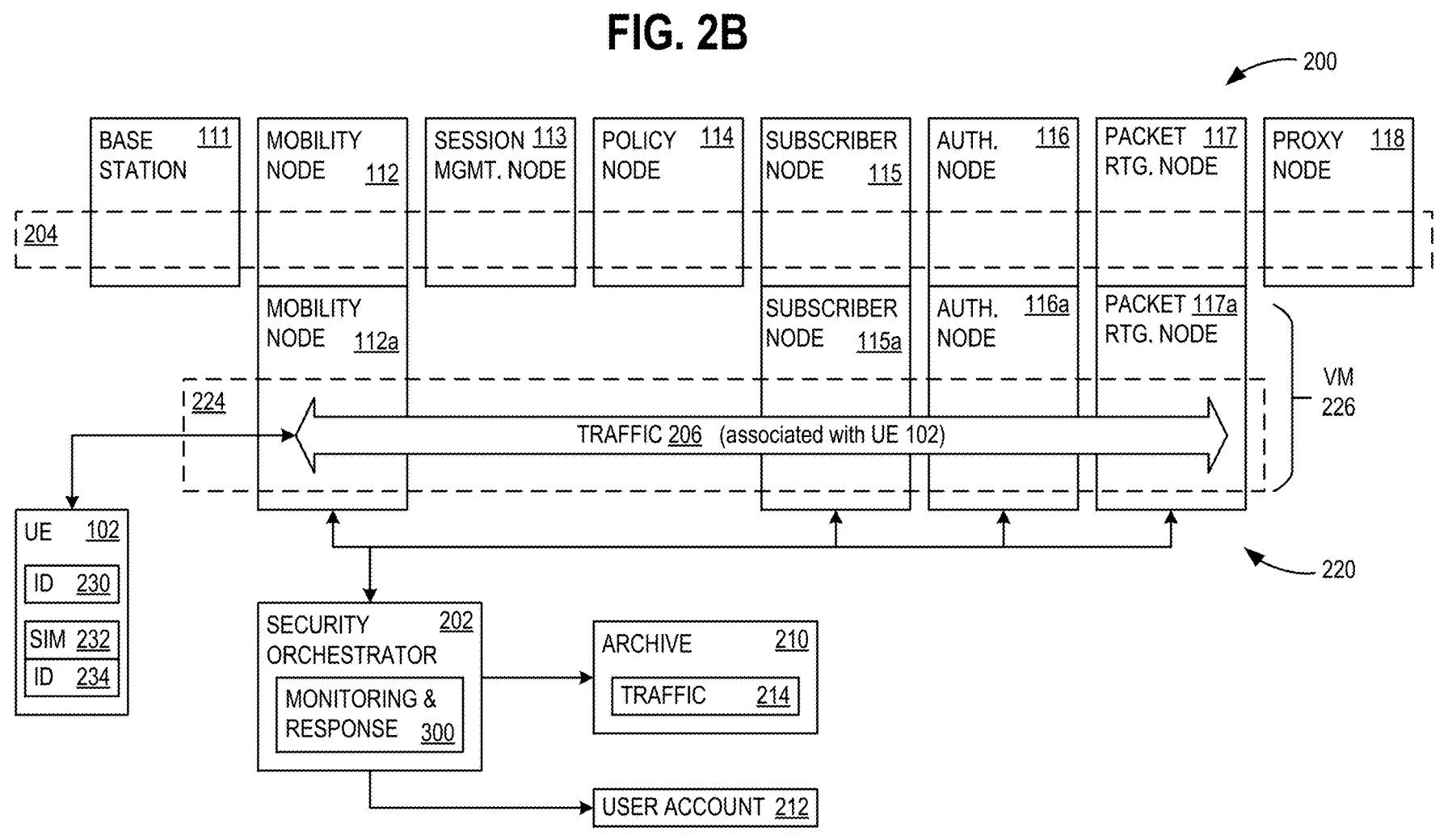

FIG. 2B illustrates the scenario of standing up an isolated network slice 224 for UE 102 and moving traffic 206 (to/from UE 102 and otherwise associated with UE 102) to isolated network slice 224, upon security orchestrator 202 identifying traffic 206 as suspected malicious activity. Isolated network slice 224 is formed using a set of NFs 220 that includes a mobility node 112a, a subscriber node 115a, an authentication node 116a, and a packet routing node 117a. Traffic 206 is then moved to isolated network slice 224. Each of mobility node 112a, subscriber node 115a, authentication node 116a, and packet routing node 117a may comprise a virtual compute environment 226.

In some examples, any of mobility node 112a, subscriber node 115a, authentication node 116a, and packet routing node 117a may execute (under the control of a hypervisor) on the same underlying hardware resources as mobility node 112, subscriber node 115, authentication node 116, and packet routing node 117 from which traffic 206 was moved. The virtualization provides isolation. The captured portion of traffic 206 is analyzed by security orchestrator 202, using monitoring and response data 300, and may further be stored in archive 210 as captured traffic 214, as shown. Further detail for this scenario is provided in relation to FIG. 4.

Figure 2C:
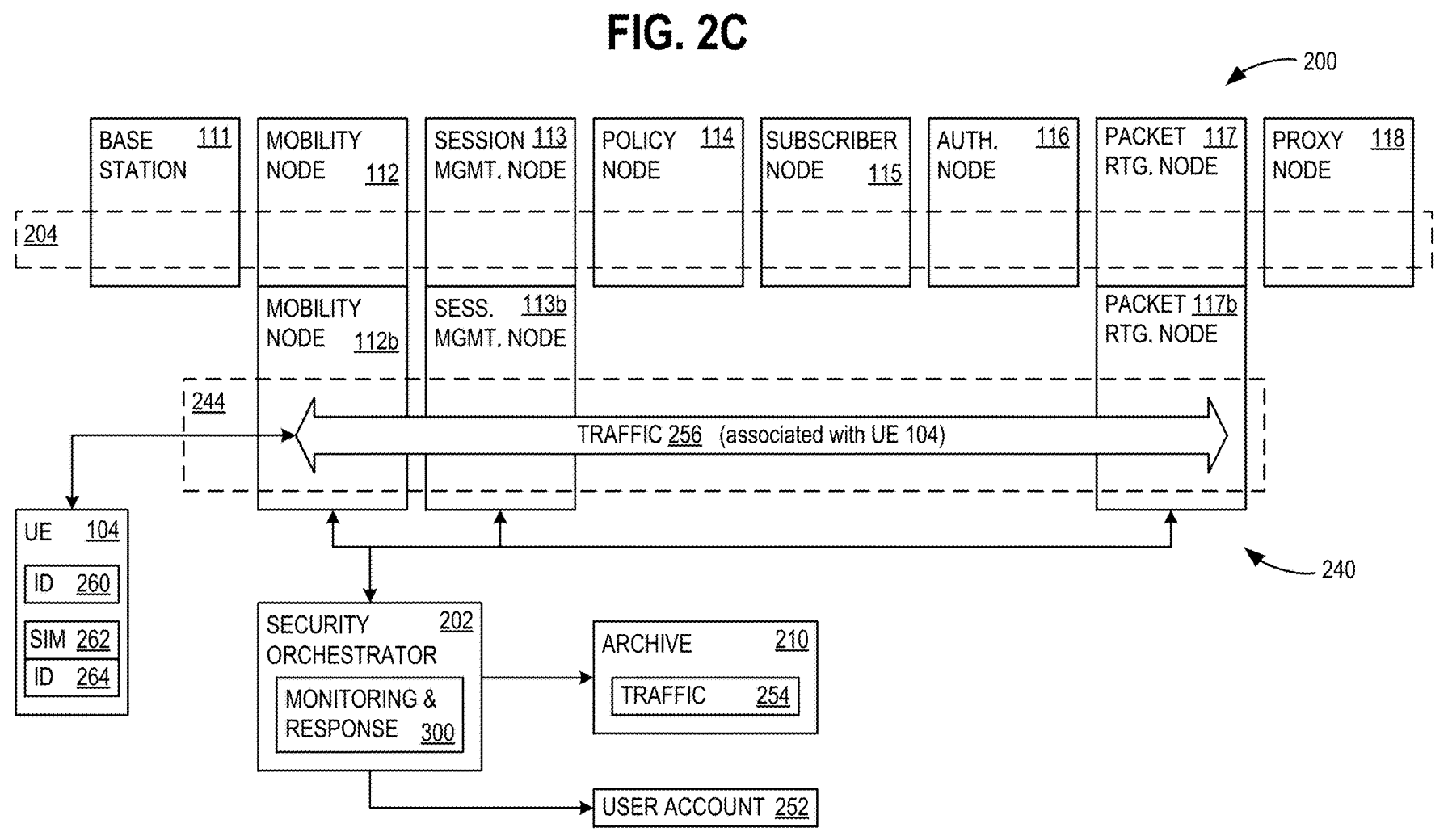

FIG. 2C illustrates the scenario of standing up an isolated network slice 244 for UE 104 and moving traffic 256 (to/from UE 104 and otherwise associated with UE 104) to isolated network slice 244, upon security orchestrator 202 identifying traffic 256 as suspected malicious activity. Initially, traffic 256 to/from (and otherwise associated with) UE 104 passes through portion 204 of wireless network 110. UE 104 has a UE identifier 260, which may be an IMEI, and a SIM 262 that has an identifier 264 that may be an ICCID. Wireless network 110 may user either UE identifier 260 or identifier 264 of SIM 262 to identify UE 104, and associate UE 104 with both traffic 256 and a user account 252.

Security orchestrator 202 uses monitoring and response data 300 to determine whether traffic 256, passing through plurality of NFs 200, may be malicious and, if so, select which NFs of plurality of NFs 200 for which an isolated version should be stood up to create isolated network slice 244. Isolated network slice 244 is formed using a set of NFs 240 that includes a mobility node 112b, a session management node 113b, and a packet routing node 117b. Traffic 256 is then moved to isolated network slice 244. Each of mobility node 112b, session management node 113b, and packet routing node 117b may comprise a virtual compute environment (such as virtual compute environment 226). In the illustrated scenarios of FIGS. 2B and 2C, set of NFs 240 that forms isolated network slice 244 differs from set of NFs 220 that forms isolated network slice 224 because the type of malicious traffic associated with UE 104 differs from the type of malicious traffic associated with UE 102 (i.e., UE 102 and UE 104 are engaging in different categorized attacks). In some examples, the set of NFs selected for an isolated network slice depends upon the type of malicious activity detected or suspected.

In some examples, any of mobility node 112b, session management node 113b, and packet routing node 117b may execute (under the control of a hypervisor) on the same underlying hardware resources as mobility node 112, session management node 113, and packet routing node 117 from which traffic 206 was moved. The captured portion of traffic 256 is analyzed by security orchestrator 202, using monitoring and response data 300, and may further be stored in archive 210 as captured traffic 254, as shown. Further detail for this scenario is provided in relation to FIG. 4. Further detail for this scenario is provided in relation to FIG. 4.

FIG. 3 shows further detail for monitoring and response data 300 that identifies different types of malicious activity or malicious traffic as different categorized attacks 340. Illustrated examples include, under a column heading Malicious Activity Type 302, Data Exfiltration as a type 310, Unauthorized Use as a type 320, and Denial of Service as a type 330. Other types may also be included, in some examples. The different types may be identified (determined, diagnosed, etc.) using indications 342 of malicious activity under a column heading Indications 304. Various sets of indications 342 are represented generically using indications 312 of type 310 of malicious activity, indications 322 of type 320 of malicious activity, and indications 332 of type 330 of malicious activity. Indications 342 may be constructed by persons having skill in diagnosing different ones of categorized attacks 340. Other types of malicious activity (attack categories) include API exploitation, reconnaissance, a replay attack, and packet tampering. These may have their own indications 342.

A column heading Network Functions to Isolate 306 lists various sets of NFs to use to form an isolated telco stack (an isolated network slice) upon identification of suspected malicious activity of a particular type. These include set of NFs 220 for type 310 of malicious activity, set of NFs 240 for type 320 of malicious activity, and set of NFs 334 for type 330 of malicious activity. Revisiting FIGS. 2B and 2C, it can be seen that the scenario depicted in FIG. 2B is data exfiltration (type 310), and the scenario depicted in FIG. 2C is unauthorized use (type 320). This illustrates how an isolated network slice may be tailored for a particular type of categorized attack 340.

Denial of service (type 330) may also be identified as non-access stratum (NAS) flood, in which an observable behavior is a UE pinging back and forth between two cells. The NAS is a functional layer in the protocol stack that is used to manage the establishment of communication sessions and for maintaining continuous communications between wireless network 110 and a UE, as the UE moves among the coverage of different cells.

When the captured traffic is analyzed (e.g., captured traffic 214 or captured traffic 254) a responsive action is selected. For false alarms, the responsive action may be to merely return the UE to portion 204 of wireless network 110 (the default or normal portion of wireless network 110), and deconstruct the isolated network slice. In such scenarios, the user of the affected UE may not even be aware of the security procedure of isolating and analyzing the UE's traffic.

However, when the activity is confirmed as being malicious, a set of response options is available under a column heading Responsive Network Options 308. Responsive options 316 for type 310 of malicious activity include removing the UE from wireless network 110, blocking the UE from wireless network 110 either for a period of time or permanently, blocking the UE engaging in the malicious activity and also all other UEs associated with the same user account from wireless network 110, altering traffic to or from the UE, and storing traffic to or from (and associated with) the UE in archive 210. Blocking UEs may use the UE identifier and/or the identifier of the SIM within the UE.

Responsive options 326 for type 320 of malicious activity include removing the UE from wireless network 110, blocking the UE from wireless network 110, and blocking all UEs associated with the same user account as the UE engaged in the malicious activity (unauthorized use, in this scenario). Responsive options 336 for type 330 of malicious activity include removing the UE from wireless network 110, blocking the UE from wireless network 110, blocking all UEs associated with the same user account, and altering traffic to or from the UE. Other variations of sets of options for these and other types of malicious activity may be used, in some examples. As illustrated, a responsive action 318 (blocking all UEs associated with the same user account) is selected for the scenario of FIG. 2B, and a responsive action 328 (blocking the UE) is selected for the scenario of FIG. 2C. Other types of malicious activity, such as API exploitation, reconnaissance, replay attack, and packet tampering may each have their own custom responsive action options.

Figure 4:
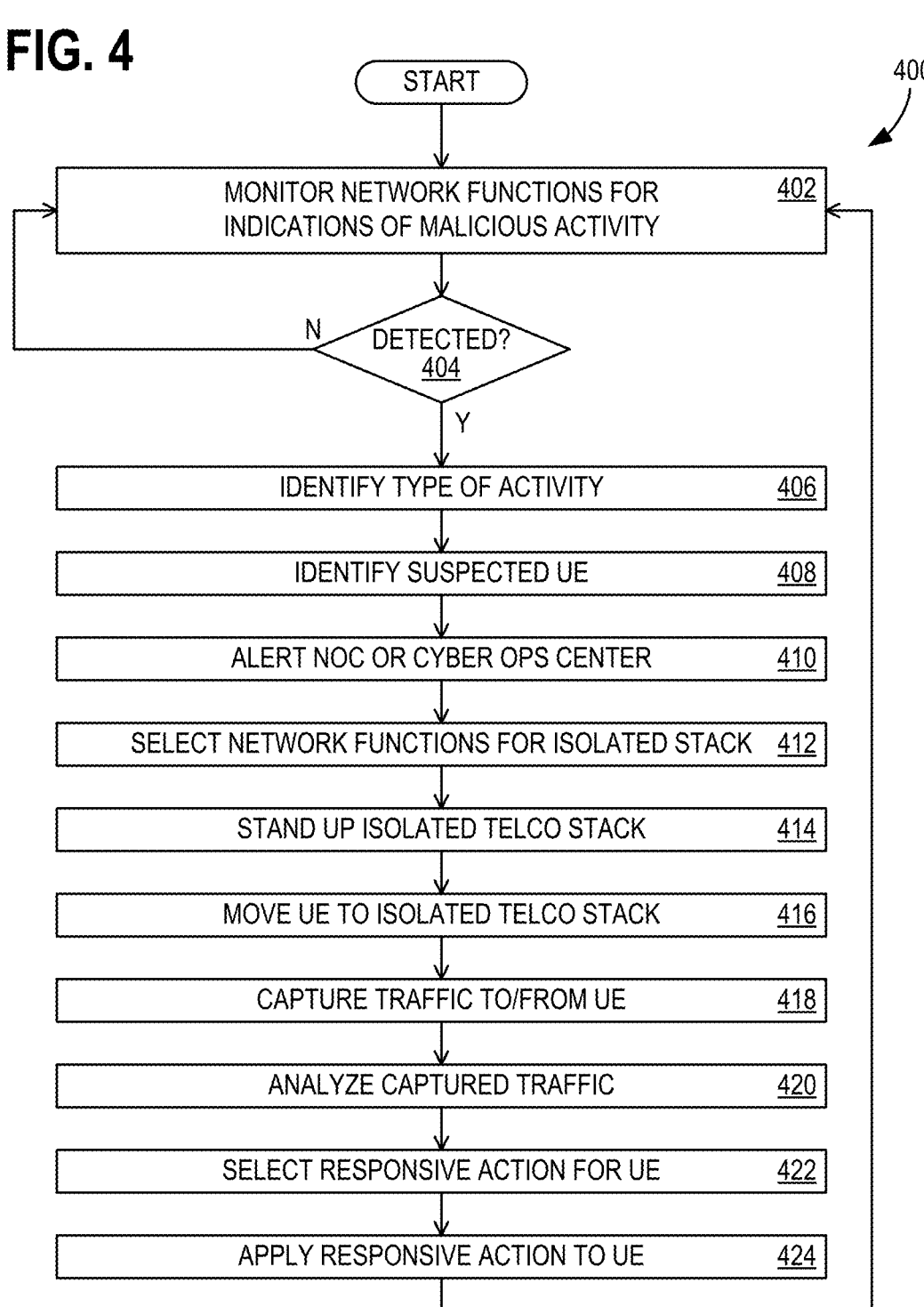

FIG. 4 illustrates a flowchart 400 of exemplary operations associated with examples of architecture 100. In some examples, at least a portion of flowchart 400 may be performed using one or more computing devices 600 of FIG. 6. Flowchart 400 commences with security orchestrator 202 monitoring plurality of NFs 200 of wireless network 110 for indications 342 of malicious activity in portion 204 of wireless network 110, in operation 402. The malicious activity may be malicious traffic and/or a cybersecurity event.

Decision operation 404 determines whether malicious activity was possibly detected by operation 402, for example in traffic 206. If not, operation 402 continues until suspected malicious activity is detected. When malicious activity is detected, operation 406 identifies the type. The description of this first pass through flowchart 400 is aligned with the scenario of FIG. 2B, and a later description of a second pass through flowchart 400 is aligned with the scenario of FIG. 2C. In this first pass, operation 406 identifies that traffic 206, associated with UE 102, is of type 310, data exfiltration.

In operation 408, security orchestrator 202 identifies UE 102 as associated with type 310 of malicious activity using traffic 206, and generates alert 216 in operation 410, based on at least determining the occurrence of the malicious activity. Security orchestrator 202 selects set of NFs 220 to form isolated network slice 224, based on at least determining an occurrence of type 310 of malicious activity, in operation 412.

For example, when the type of malicious activity comprises data exfiltration, the isolated network slice comprises a mobility node, an authentication node, a subscriber node, and a packet routing node; when the type of malicious activity comprises denial of service, the isolated network slice comprises a mobility node; when the type of malicious activity comprises unauthorized use, the isolated network slice comprises a mobility node, a session management node, and a packet routing node.

Security orchestrator 202 stand up isolated network slice 224 in real time or near real time (i.e., within seconds or minutes, rather than hours), in operation 414, and moves UE 102 to isolated network slice 224 in operation 416. In operation 418, security orchestrator 202 captures captured traffic 214, which is associated with UE 102, from isolated network slice 224. Security orchestrator 202 analyzes captured traffic 214 in operation 420, and in operation 422, selects responsive action 318 to apply to UE 102, based on at least the analysis of captured traffic 214. The selected responsive action 318 is applied to UE 102 in operation 424.

A responsive option may include returning the UE to portion 204 of wireless network 110, removing the UE from wireless network 110, blocking the UE from wireless network 110 using a UE identifier (e.g., UE identifier 230 or 260), blocking the UE from wireless network 110 using an identifier of a SIM within the UE (e.g., identifier 234 within SIM 232 or identifier 264 within SIM 262), blocking all UEs associated with a user account that is associated with the UE (e.g., user account 212 or user account 252), altering traffic to or from the UE (e.g., traffic 206 or traffic 256), and/or storing captured traffic (e.g., captured traffic 214 or captured traffic 254) in archive 210. The specific set of available options, from which security orchestrator 202 selects, may depend on the type of malicious activity.

For the scenario depicted in FIG. 2C, a second pass through flowchart 400 is described. Decision operation 404 determines whether malicious activity was possibly detected by operation 402, for example in traffic 256. If not, operation 402 continues until suspected malicious activity is detected. In this second pass, operation 406 identifies that traffic 256, associated with UE 104, is of type 320, unauthorized use.

In operation 408, security orchestrator 202 identifies UE 104 as associated with type 320 of malicious activity using traffic 256, and generates alert 216 in operation 410, based on at least determining the occurrence of the malicious activity. Security orchestrator 202 selects set of NFs 240 to form isolated network slice 244, based on at least determining an occurrence of type 320 of malicious activity, in operation 412.

Security orchestrator 202 stand up isolated network slice 244 in real time or near real time, in operation 414, and moves UE 104 to isolated network slice 244 in operation 416. In operation 418, security orchestrator 202 captures captured traffic 254, which is associated with UE 104, from isolated network slice 244. Security orchestrator 202 analyzes captured traffic 254 in operation 420, and in operation 422, selects responsive action 328 to apply to UE 104, based on at least the analysis of captured traffic 254. The selected responsive action 328 is applied to UE 104 in operation 424.

FIG. 5 illustrates a flowchart 500 of exemplary operations associated with architecture 100. In some examples, at least a portion of flowchart 500 may be performed using one or more computing devices 600 of FIG. 6. Flowchart 500 commences with operation 502, which includes monitoring a plurality of NFs of a wireless network for indications of malicious activity in a first portion of the wireless network. Operation 504 includes based on at least determining an occurrence of a first type of malicious activity, selecting a first set of NFs to form a first isolated network slice.

Operation 506 includes identifying a first UE associated with first type of malicious activity. Operation 508 includes moving the first UE to the first isolated network slice. Operation 510 includes analyzing captured traffic from the first isolated network slice and which is associated with the first UE. Operation 512 includes, based on at least analyzing the captured traffic from the first isolated network slice, selecting a first responsive action to apply to the first UE. Operation 514 includes applying the first responsive action to the first UE.

Figure 6:
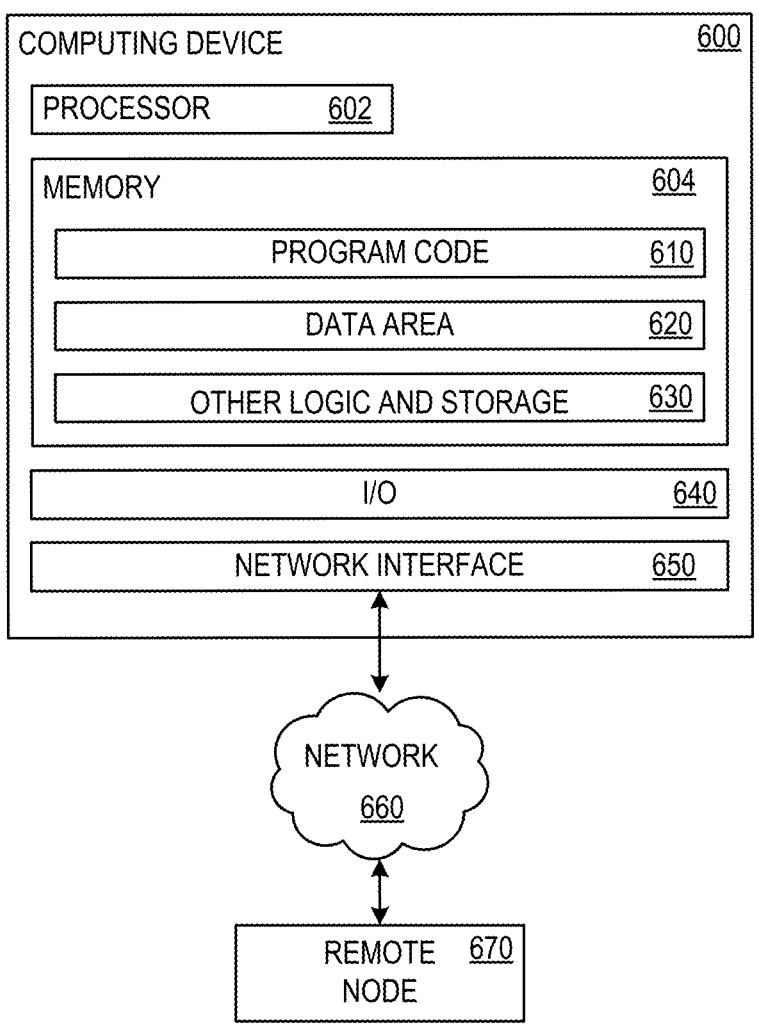
FIG. 6 illustrates a block diagram of a computing device suitable for implementing various aspects of the disclosure.

FIG. 6 illustrates a block diagram of computing device 600 that may be used as any component described herein that may require computational or storage capacity. Computing device 600 has at least a processor 602 and a memory 604 that holds program code 610, data area 620, and other logic and storage 630. Memory 604 is any device allowing information, such as computer executable instructions and/ or other data, to be stored and retrieved. For example, memory 604 may include one or more random access memory (RAM) modules, flash memory modules, hard disks, solid-state disks, persistent memory devices, and/or optical disks. Program code 610 comprises computer executable instructions and computer executable components including instructions used to perform operations described herein. Data area 620 holds data used to perform operations described herein. Memory 604 also includes other logic and storage 630 that performs or facilitates other functions disclosed herein or otherwise required of computing device 600. An input/output (I/O) component 640 facilitates receiving input from users and other devices and generating displays for users and outputs for other devices. A network interface 650 permits communication over external network 660 with a remote node 670, which may represent another implementation of computing device 600. For example, a remote node 670 may represent another of the above-noted nodes within architecture 100.

Additional Examples

An example system comprises: a processor; and a computer-readable medium storing instructions that are operative upon execution by the processor to: monitor a plurality of NFs of a wireless network for indications of malicious activity in a first portion of the wireless network; based on at least determining an occurrence of a first type of malicious activity, select a first set of NFs to form a first isolated network slice; identify a first UE associated with first type of malicious activity; move the first UE to the first isolated network slice; analyze captured traffic from the first isolated network slice and which is associated with the first UE; based on at least analyzing the captured traffic from the first isolated network slice, select a first responsive action to apply to the first UE; and apply the first responsive action to the first UE.

An example method comprises: monitoring a plurality of NFs of a wireless network for indications of malicious activity in a first portion of the wireless network; based on at least determining an occurrence of a first type of malicious activity, selecting a first set of NFs to form a first isolated network slice; identifying a first UE associated with first type of malicious activity; moving the first UE to the first isolated network slice; analyzing captured traffic from the first isolated network slice and which is associated with the first UE; based on at least analyzing the captured traffic from the first isolated network slice, selecting a first responsive action to apply to the first UE; and applying the first responsive action to the first UE.

One or more example computer storage devices has computer-executable instructions stored thereon, which, upon execution by a computer, cause the computer to perform operations comprising: monitoring a plurality of NFs of a wireless network for indications of malicious activity in a first portion of the wireless network; based on at least determining an occurrence of a first type of malicious activity, selecting a first set of NFs to form a first isolated network slice; identifying a first UE associated with first type of malicious activity; moving the first UE to the first isolated network slice; analyzing captured traffic from the first isolated network slice and which is associated with the first UE; based on at least analyzing the captured traffic from the first isolated network slice, selecting a first responsive action to apply to the first UE; and applying the first responsive action to the first UE.

Alternatively, or in addition to the other examples described herein, examples include any combination of the following:

the wireless network comprises a cellular network;

the plurality of NFs includes at least three NFs selected from the list consisting of: a base station, a mobility node, a session management node, a packet routing node, a proxy node, a subscriber node, an authentication node, and a policy node;

the base station comprises a gNB or an eNB;

the mobility node comprises an AMF or an MME;

the session management node comprises an SMF or an SAEGW-C;

the packet routing node comprises a UPF or an SAEGW-U;

the proxy node comprises a P-CSCF;

the authentication node comprises an AUSF;

the subscriber node comprises a UDM or an HSS;

the policy node comprises a PCF or a PCRF;

based on at least determining an occurrence of a second type of malicious activity different than the first type of malicious activity, selecting a second set of NFs to form a second isolated network slice;

the second set of NFs has at least one NF differing from the first set of NFs;

identifying a second UE associated with second type of malicious activity;

moving the second UE to the second isolated network slice;

analyzing captured traffic from the second isolated network slice and which is associated with the second UE;

based on at least analyzing the captured traffic from the second isolated network slice, selecting a second responsive action to apply to the second UE;

applying the second responsive action to the second UE;

each of the first responsive action and the second responsive action is selected from the list consisting of: returning the first or second UE to the first portion of the wireless network, removing the first or second UE from the wireless network, blocking the first or second UE from the wireless network using a UE identifier of the first or second UE, blocking the first or second UE from the wireless network using an identifier of a SIM within the first or second UE, blocking all UEs associated with a user account that is associated with the first or second UE from the wireless network, altering traffic to or from the first or second UE, and storing traffic to or from the first or second UE in an archive;

the first type of malicious activity and the second type of malicious activity are each selected from the list consisting of: data exfiltration, denial of service, unauthorized use, API exploitation, reconnaissance, replay attack, and packet tampering;

when the type of malicious activity comprises data exfiltration, the isolated network slice comprises a mobility node, an authentication node, a subscriber node, and a packet routing node;

when the type of malicious activity comprises denial of service, the isolated network slice comprises a mobility node;

when the type of malicious activity comprises unauthorized use, the isolated network slice comprises a mobility node, a session management node, and a packet routing node;

the malicious activity comprises malicious traffic through a monitored NF;

the malicious activity comprises a cybersecurity event;

the first type of malicious activity and the second type of malicious activity each comprises a categorized attack;

based on at least determining the occurrence of the first type of malicious activity, generating an alert;

based on at least determining the occurrence of the second type of malicious activity, generating an alert;

capturing traffic from the first isolated network slice and which is associated with the first UE;

capturing traffic from the second isolated network slice and which is associated with the second UE;

the UE identifier comprises an IMEI;

the identifier of the SIM comprises an ICCID;

a security orchestrator monitors the plurality of NFs, selects the first set of NFs and the second set of NFs, and selects the first responsive action and the second responsive action;

each NF of the first set of NFs and the second set of NFs comprises a virtual compute environment comprising a VM or a container; and the UEs each comprises a cellular telephone, or an FWA device, or an IoT device, or an M2M communication device.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure. It will be understood that the benefits and advantages described above may relate to one embodiment or may relate to several embodiments. When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of."

Having described aspects of the disclosure in detail, it will be apparent that modifications and variations are possible without departing from the scope of aspects of the disclosure as defined in the appended claims. As various changes may be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A method comprising:

monitoring, by a security orchestrator, network functions (NFs) of a wireless network for indications of malicious activity in a first portion of the wireless network;

detecting, by the security orchestrator while monitoring the NFs, a specific type of malicious activity from a list of malicious activity types that includes a data exfiltration malicious activity type, an unauthorized use malicious activity type, a denial of service malicious activity type, an API exploitation malicious activity type, a reconnaissance malicious activity type, a replay attack malicious activity type, and a packet tampering malicious activity type;

selecting a specific subset of the NFs to form an isolated network slice based on the specific type of malicious activity detected by the security orchestrator, wherein different subsets of the NFs are selected to form the isolated network slice for different detected malicious activity types in the list of malicious activity types;

identifying a user equipment (UE) associated with the specific type of malicious activity;

moving the UE to the isolated network slice;

analyzing traffic of the UE captured from the isolated network slice;

based on at least analyzing the traffic of the UE captured from the isolated network slice, selecting a responsive action to apply to the UE; and applying the responsive action to the UE.

2. The method of claim 1, wherein the NFs includes at least three NFs selected from a list consisting of:

a base station, a mobility node, a session management node, a packet routing node, a proxy node, a subscriber node, an authentication node, and a policy node.

3. The method of claim 2, wherein the base station comprises a gNodeB (gNB) or an eNodeB (eNB);

wherein the mobility node comprises an access mobility function (AMF) or a mobility management entity (MME);

wherein the session management node comprises a session management function (SMF) or a system architecture evolution gateway (SAEGW) control plane (SAEGW-C);

wherein the packet routing node comprises a user plane function (UPF) or an SAEGW-user plane (SAEGW-U);

wherein the proxy node comprises a proxy call session control function (P-CSCF);

wherein the authentication node comprises an authentication server function (AUSF);

wherein the subscriber node comprises a unified data management (UDM) or a home subscriber server (HSS); and wherein the policy node comprises a policy control function (PCF) or a policy and charging rules function (PCRF).

4. The method of claim 1, wherein the responsive action includes returning the UE to the first portion of the wireless network.

5. The method of claim 1, wherein the responsive action includes removing the UE from the wireless network.

6. The method of claim 1, wherein the responsive action includes blocking the UE from the wireless network based on a UE identifier of the UE.

7. The method of claim 1, wherein the responsive action includes blocking the UE from the wireless network based on a subscriber identity module (SIM) of the UE.

8. The method of claim 1, wherein the responsive action includes altering traffic to or from the UE and storing the traffic to or from the UE in an archive.

9. The method of claim 1, wherein a mobility node, an authentication node, a subscriber node, and a packet routing node are selected for the isolated network slice when the specific type of malicious activity is the data exfiltration malicious activity type.

10. The method of claim 1, wherein a mobility node, a session management node, and a packet routing node are selected for the isolated network slice when the specific type of malicious activity is the unauthorized use malicious activity type.

11. The method of claim 1, wherein a mobility node is selected for the isolated network slice when the specific type of malicious activity is the denial of service malicious activity type.

12. A system comprising:

a processor; and a computer-readable medium storing programming instructions for execution by the processor, the programming instructions, upon execution by the processor, causing the system to perform the following operations:

monitoring, by a security orchestrator, network functions (NFs) of a wireless network for indications of malicious activity in a first portion of the wireless network;

detecting, by the security orchestrator while monitoring the NFs, a specific type of malicious activity from a list of malicious activity types that includes a data exfiltration malicious activity type, an unauthorized use malicious activity type, a denial of service malicious activity type, an API exploitation malicious activity type, a reconnaissance malicious activity type, a replay attack malicious activity type, and a packet tampering malicious activity type;

selecting a specific subset of the NFs to form an isolated network slice based on the specific type of malicious activity detected by the security orchestrator, wherein different subsets of the NFs are selected to form the isolated network slice for different detected malicious activity types in the list of malicious activity types;

identifying a user equipment (UE) associated with the specific type of malicious activity;

moving the UE to the isolated network slice;

analyzing traffic of the UE captured from the isolated network slice;

based on at least analyzing the traffic of the UE captured from the isolated network slice, selecting a responsive action to apply to the UE; and applying the responsive action to the UE.

13. The system of claim 12, wherein the NFs includes at least three NFs selected from a list consisting of:

a base station, a mobility node, a session management node, a packet routing node, a proxy node, a subscriber node, an authentication node, and a policy node.

14. The system of claim 13, wherein the base station comprises a gNodeB (gNB) or an eNodeB (eNB);

wherein the mobility node comprises an access mobility function (AMF) or a mobility management entity (MME);

wherein the session management node comprises a session management function (SMF) or a system architecture evolution gateway (SAEGW) control plane (SAEGW-C);

wherein the packet routing node comprises a user plane function (UPF) or an SAEGW-user plane (SAEGW-U);

wherein the proxy node comprises a proxy call session control function (P-CSCF);

wherein the authentication node comprises an authentication server function (AUSF);

wherein the subscriber node comprises a unified data management (UDM) or a home subscriber server (HSS); and wherein the policy node comprises a policy control function (PCF) or a policy and charging rules function (PCRF).

15. One or more computer storage devices having programming instructions stored thereon, which, upon execution by a processor of a system, cause the system to perform the following operations:

monitoring, by a security orchestrator, network functions (NFs) of a wireless network for indications of malicious activity in a first portion of the wireless network;

detecting, by the security orchestrator while monitoring the NFs, a specific type of malicious activity from a list of malicious activity types that includes a data exfiltration malicious activity type, an unauthorized use malicious activity type, a denial of service malicious activity type, an API exploitation malicious activity type, a reconnaissance malicious activity type, a replay attack malicious activity type, and a packet tampering malicious activity type;

selecting a specific subset of the NFs to form an isolated network slice based on the specific type of malicious activity detected by the security orchestrator, wherein different subsets of the NFs are selected to form the isolated network slice for different detected malicious activity types in the list of malicious activity types;

identifying a user equipment (UE) associated with the specific type of malicious activity;

moving the UE to the isolated network slice;

analyzing traffic of the UE captured from the isolated network slice;

based on at least analyzing the traffic of the UE captured from the isolated network slice, selecting a responsive action to apply to the UE; and applying the responsive action to the UE.

16. The one or more computer storage devices of claim 15, wherein the NFs includes at least three NFs selected from a list consisting of:

a base station, a mobility node, a session management node, a packet routing node, a proxy node, a subscriber node, an authentication node, and a policy node.

17. The one or more computer storage devices of claim 16, wherein the base station comprises a gNodeB (gNB) or an eNodeB (eNB);

wherein the mobility node comprises an access mobility function (AMF) or a mobility management entity (MME);

wherein the session management node comprises a session management function (SMF) or a system architecture evolution gateway (SAEGW) control plane (SAEGW-C);

wherein the packet routing node comprises a user plane function (UPF) or an SAEGW-user plane (SAEGW-U);

wherein the proxy node comprises a proxy call session control function (P-CSCF);

wherein the authentication node comprises an authentication server function (AUSF);

wherein the subscriber node comprises a unified data management (UDM) or a home subscriber server (HSS); and wherein the policy node comprises a policy control function (PCF) or a policy and charging rules function (PCRF).

* * * * *